United States Patent [19]

Jeong et al.

[11] Patent Number: 5,488,637
[45] Date of Patent: Jan. 30, 1996

[54] DECODING METHOD AND APPARATUS HAVING OPTIMUM DECODING PATHS

[75] Inventors: Jechang Jeong, Seoul; Hyunsoo Shin, Suwon, both of Rep. of Korea

[73] Assignee: Samsung Electronics Co., Ltd., Kyungki-do, Rep. of Korea

[21] Appl. No.: 219,293

[22] Filed: Mar. 28, 1994

[30] Foreign Application Priority Data

Mar. 26, 1993 [KR] Rep. of Korea ............... 93-4815

[51] Int. Cl.⁶ .................................... H04L 27/06
[52] U.S. Cl. ............................ 375/341; 371/43
[58] Field of Search .................... 375/262, 264, 375/286, 340–341; 371/43; 329/300, 304, 311, 315, 347

[56] References Cited

U.S. PATENT DOCUMENTS

| | | | |
|---|---|---|---|
| 4,677,625 | 6/1987 | Betts et al. | 371/43 |
| 5,321,705 | 6/1994 | Gould et al. | 371/43 |
| 5,335,250 | 8/1994 | Dent et al. | 375/340 |

*Primary Examiner*—Young Tse
*Attorney, Agent, or Firm*—Sughrue, Mion, Zinn, Macpeak & Seas

[57] ABSTRACT

A decoding method and apparatus having an optimum decoding path includes a Viterbi decoder having an overlapping function in which the input signal is moved in units of the window movement distance of at least one symbol and the code sequence is decoded in units representing a decoding depth, so that overlap in the decoded data occurs. Then, the output of the Viterbi decoder with the overlap function is stored in a memory. A control signal generator controls the positions of the data to be output from the memory according to the output of a counter receiving the decoded data. The most frequent data out of all data supplied to a comparator is selected as an optimum decoding path. Thus, the error associated with wrong path selection, e.g., when the data is wrongly decoded due to the error generated by the noise added during transmission, can be reduced.

18 Claims, 4 Drawing Sheets

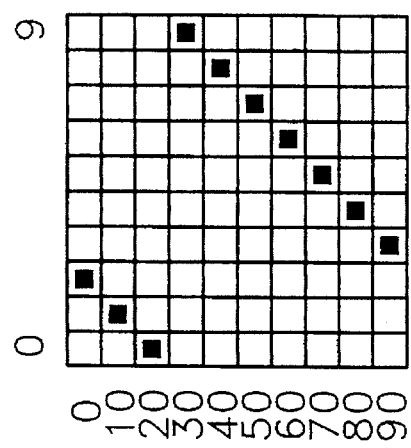
FIG. 6A  
FIG. 6B  
FIG. 6C
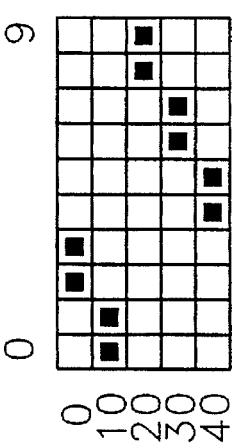
FIG. 6F
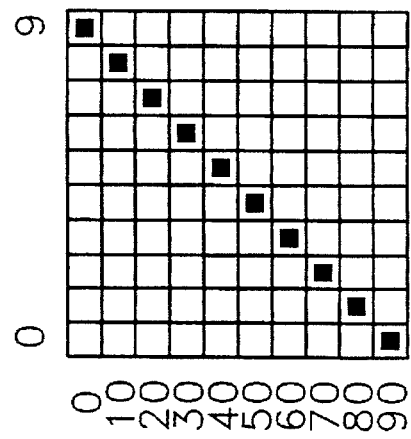
FIG. 6D  
FIG. 6E
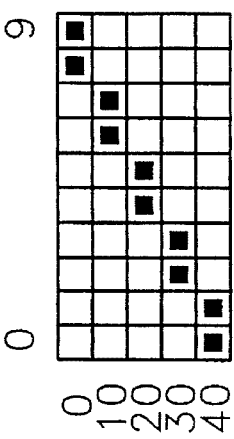
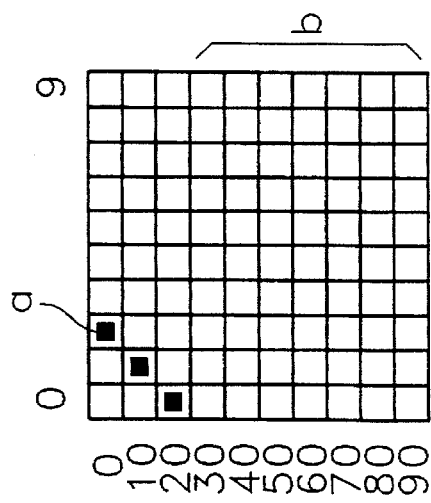
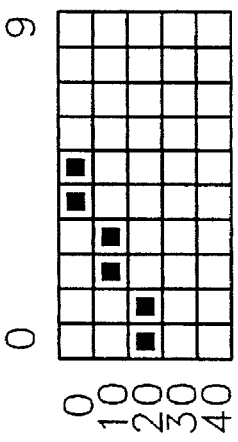

DECODING METHOD AND APPARATUS HAVING OPTIMUM DECODING PATHS

BACKGROUND OF THE INVENTION

The present invention relates to a demodulation method and apparatus for use in demodulating convolutional codes and Trellis coded modulation (TCM) signal, and more particularly to a decoding method and apparatus having an optimum decoding path in which received data is decoded using an overlapped Viterbi decoder and the decoded data is output.

In general digital communications, a signal transmitted from a transmission portion is changed into another signal different from the original signal due to influence of noise imposed on channels, and the changed signal is received by a reception portion. To reduce errors generated in the signal, the digital communication uses an error correcting method to reduce errors generated in the transmission line. Channel encoding methods using a Reed-Solomon code, a convolutional code, etc., are known. The convolutional code is strong with respect to a random error. A maximum likelihood decoding method proposed by Viterbi is chiefly used as a method of decoding the convolutional code.

FIG. 1 is a block diagram of one example of a convolutional encoder.

The FIG. 1 apparatus is an encoder which uses (2,1,2) convolutional code. The encoder includes a first delay 11 which receives bit data $D_{IN}$ input from an external information source and stores the input bit data, and simultaneously outputs the previously stored bit data. The output of first delay 11 is connected to a second delay 12 which stores the data supplied from first delay 11 and simultaneously outputs the previously stored bit dam. Also, the appratus includes a first exclusive-OR (XOR) gate 13 for exclusive-ORing the the bit data $D_{IN}$ and the data serially output from first and second delays 11, 12, and a second XOR gate 14 for exclusive-ORing the bit data $D_{IN}$ the bit data supplied from first delay 11 and the bit data serially output from first and second delays 11 and 12. The outputs from first and second XOR gates 13 and 14 are supplied to a switching portion 15 which sequentially transmits the data received from first and second XOR gates 13 and 14 as 2-bit data.

In FIG. 1, it is assumed that initial states of first and second delays 11 and 12 are "0" and "0, " respectively, and the bit data input from the external information source is "1", "0", "1", "1", and "1". At first, a first bit "1" of the bit data is supplied to first delay 11 and first and second XOR gates 13 and 14, respectively. First delay 11 stores the input data "1" and simultaneously supplies the previously stored data "0" to second delay 12 and second XOR gate 14, respectively. Second delay 12 receives the data "0" supplied from first delay 11 and stores the received data, and supplies the stored data "0" to first and second XOR gates 13 and 14. Thus, first delay 11 stores the bit data "1", and second delay 12 stores the bit data "0". As a result, when the bit data "1" is input to first delay 11, both first and second XOR gates 13 and 14 output the bit data "1". Then, switching portion 15 outputs the input data sequentially in such a manner that the bit data supplied from first XOR gate 13 is outputted and then the bit data supplied from second XOR gate 14 is outputted. By repetitively performing the above procedure, the outputs $D_{OUT}$ of the convolutional encoder and the states of delays 11 and 12 are obtained as in the following Table 1.

TABLE 1

| STEP | INPUT ($D_{IN}$) | STATE OF DELAYS 11 | STATE OF DELAYS 12 | OUTPUT ($D_{OUT}$) | |
|---|---|---|---|---|---|
| INITIAL | | 0 | 0 | | |
| 1 | 1 | 1 | 0 | 1 | 1 |
| 2 | 0 | 0 | 1 | 0 | 1 |
| 3 | 1 | 1 | 0 | 0 | 0 |
| 4 | 1 | 1 | 1 | 1 | 0 |
| 5 | 1 | 1 | 1 | 0 | 1 |
| 6 | 0 | 0 | 1 | 1 | 0 |
| 7 | 0 | 0 | 0 | 1 | 1 |

Here, although the total input data is 5-bit data, the output is not 10-bit data but 14-bit data. The reason is because 2-bit null data of "0" and "0" have been input for the purpose of outputting the remaining data in delays 11 and 12 after outputting the 10-bit data. This null data plays a role of converging the final state into the initial state of "0" and "0" in Trellis diagram of Viterbi decoding to be explained later on referring to FIG. 2. The characteristic of the convolutional code is in that the past input information has influence upon the encoding of the currently input information due to the delays included in the encoder. The maximum likelihood decoding method by the Viterbi algorithm is very often used in the decoding of the convolutional codes due to the correlation between the previously encoded information and the currently encoded information. The maximum likelihood decoding method makes up the Trellis diagram with respect to the encoding data as much as possible, and calculates a Hamming distance of each node with respect to the data input to the decoder in the Trellis diagram. Then, in the maximum likelihood decoding method, the Hamming distance is accumulated with respect to all possible paths, and only a path having the shortest accumulated Hamming distance is left as a survival path. The finally existing survival path becomes a decoding path with respect to all the input data.

Although such a survival path determination technology is known, it will be briefly described below using the Trellis diagram of (2,1,2) convolutional code shown in FIG. 2.

FIG. 2 is a Trellis diagram for explaining the decoding of the data which is encoded by the FIG. 1 apparatus. In FIG. 2, the node of each step has two paths. A "higher path" which is located in a relatively higher position is made when the input of the encoder is "0," and a "lower path" which is located in a relatively lower position is made when the input of the encoder is "1". Also, two bits on each path represent the output of the encoder with respect to each input, that is, the input of the decoder. When the 2-bit error is generated in the output $D_{OUT}$ which is encoded in the FIG. 1 encoder and the 2-bit error is input to the decoder, the decoder corrects the error of the input signal and restores the input signal into an original signal. The bits represented in a symbol "x" among the received data $$r = (11, \overset{x}{11}, 00, 10, 00, \overset{x}{10}, 11)$$

are the error-generated bits. The decoding procedure of the error-generated data is as follows.

At the initial step (step 0 of FIG. 2), if the data "11" is input to the decoder, the Hamminig distance to the 2-bit reference data on each path, that is, the number of the corresponding bits different from each other is obtained and stored in each node of the first step. In the same manner, the Hamming distance which is calculated with respect to the secondly input data "11" is added to the previously obtained Hamming distance and the summed Hammining distance is stored in each node of the second step. By repetitively performing such a process, a plurality of paths may be input to one node at a certain moment. In this case, the path having the shortest accumulated Hamming distance is left as a survival path among various paths, and the remaining paths are ignored. If such a process is repetitively performed, only one survival path is left at the final step. The one-bit data which is determined according as the path direction between the respective nodes forming the survival path is upward or downward and forms the decoded data. The portion which is shown in a heavy solid line in FIG. 2 is the final decoding path with respect to the received signal r. It can be seen that the decoded data is the same as the input $D_{IN}$ of the encoder. However, the data $D_{IN}$ input to the general encoder is a bit stream having a substantially infinite length. In this case, if the above-described decoding is performed with respect to the total of the encoded data, the substantially infinite time delays occur. Thus, continuous encoding is performed in the encoder, while the input data is truncated into predetermined length data in the decoder and the truncated data is decoded. The predetermined decoding length is called a decoding depth or a truncation depth. In case of FIG. 2, the length from the initial step to the fifth is the decoding depth. When decoded in such a manner, only one survival path is not left, but one survival path is left for each node at the last step. Therefore, at the last step, the Hamming distance is compared with respect to the survival path of each node, and then the path having the shortest Hamming distance is determined as the final decoding path.

The decoding with respect to one decoding depth can be divided into two methods according as how the initial state at the time of starting the decoding is established. The first method is that the initial state of the decoding depth is made to become the last state of the final decoding path of the previous decoding depth. In this case, the previous decoding information can be used as it is, but if the previous decoding path is wrong, the decoding of the decoding depth data to be decoded can be wrong. Also, this method should store the last state of the previous final decoding path. The second method does not store the last state of the previous final decoding path, but starts at all the states at the same time. In this case, since the previous decoding information is not used at all, an independent decoding can be performed at each step even if the previous decoding path was wrong. However, when the previous decoding path is correct, the possibility of selecting the wrong decoding path becomes higher than the other method.

SUMMARY OF THE INVENTION

Therefore, to solve the above problems, it is an object of the present invention to provide a decoding method having an optimum decoding path, in which, differently from the conventional method which decodes encoded data while moving in units of a decoding depth, a window movement distance having a predetermined movement distance shorter than a decoding depth is set. The symbols constituting the decoding depth are decoded several times in units of the decoding depth which moves in units of the window movement distance. The most frequent data among the data which is encoded several times is selected as the information with respect to each symbol.

Thus, to accomplish one object of the present invention, there is provided a decoding method having an optimum decoding path for use in a digital communication which decodes a code sequence having symbols, the decoding method comprising the steps of:

decoding the symbols within a window formed in units of a decoding depth after receiving the code sequence, so as to generate decoded data; overlapping the window on the code sequence by a predetermined movement distance whenever the decoding with respect to the window is completed; storing the decoded data generated for each window; reading the decoded data corresponding to an identical symbol among the stored decoded data; and comparing the number of the frequency of the read decoded data with each other to set the higher number of the frequency of the decoded data as the decoding information with respect to the corresponding symbol.

Preferably, the decoding apparatus having an optimum decoding path according to the present invention embodies the above-described decoding method having the optimum decoding path, in which the symbols constituting the decoding depth are moved in units of a window movement distance and decoded in units representing the decoding depth so as to be stored in a memory, and the most frequent data among various data generated by the decoding several times with respect to the same symbol is output as the decoded representative of the symbol.

Such an apparatus according to the present invention can be accomplished by providing a decoding apparatus having an optimum decoding path for use in a digital communication apparatus which decodes a code sequence constituting symbols, the decoding apparatus comprising:

a decoder for decoding the symbols within a window formed in units representative of a decoding depth after receiving the code sequence to thereby generate decoded dam, and for overlapping the window on the code sequence by a predetermined movement distance whenever the decoding with respect to the window is completed; memory means for storing the decoded data supplied from the decoder and providing the stored decoded data in response to an address signal; control means for receiving the decoded data from the decoder and generating the address signal for producing the decoded data corresponding to an identical symbol from the memory means; and means for providing the higher number of the frequency of the decoded data out of all of the decoded data corresponding to the identical symbol and applied from the memory means.

The symbols which are encoded in units representing the decoding depth according to the present invention can reduce the error generated due to the wrong selection of the decoding path.

BRIEF DESCRIPTION OF THE DRAWINGS

FIGS. 6A through 6F are views for explaining the operation of the control signal generator shown in the FIG. 5 apparatus.

DETAILED DESCRIPTION OF THE PREFERRED EMBODIMENT

A preferred embodiment of the present invention will be described below in more detail with reference to the accompanying drawings.

Firstly, the conventional Viterbi algorithm will be described referring to FIG. 3, and then the present invention in which the symbols are overlapped will be described with reference to FIGS. 4A and 4B.

Figure 1:
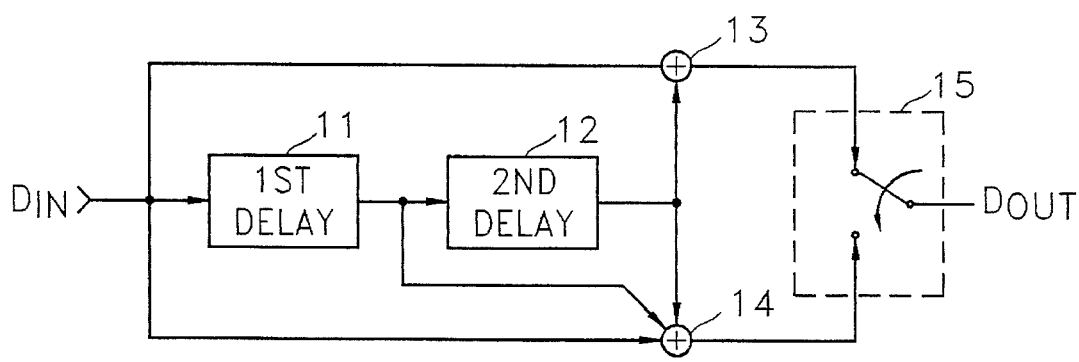
FIG. 1 is a block diagram showing a conventional convolutional encoding apparatus.
Figure 2:
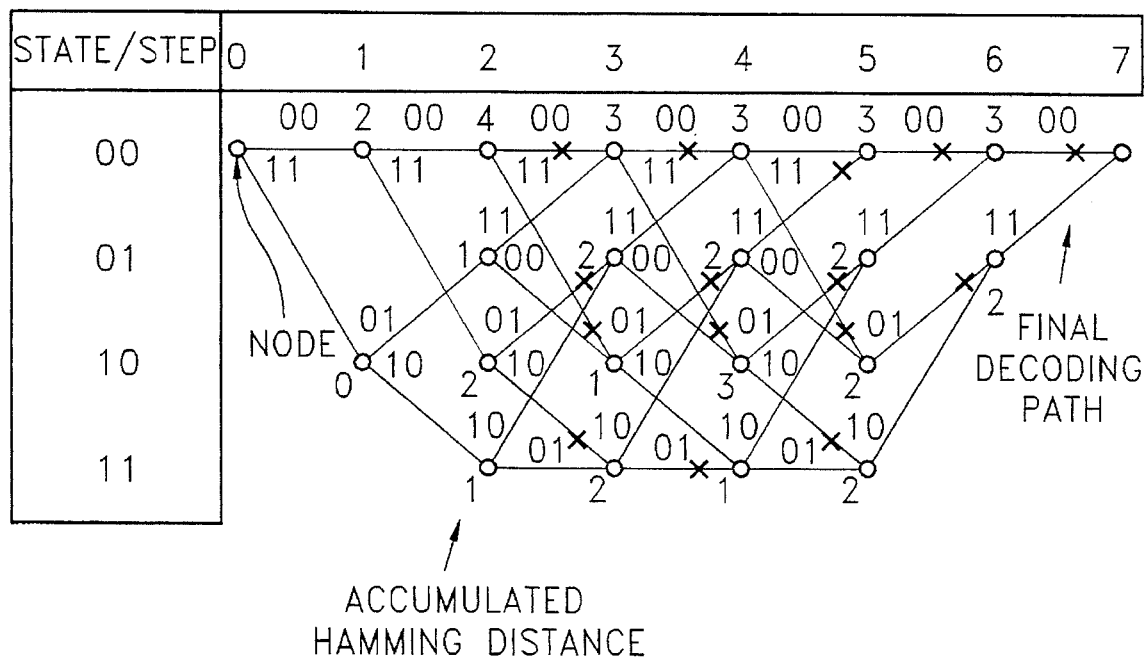
FIG. 2 is a Trellis diagram for explaining the decoding of the data which is encoded in the FIG. 1 apparatus.
Figure 3:
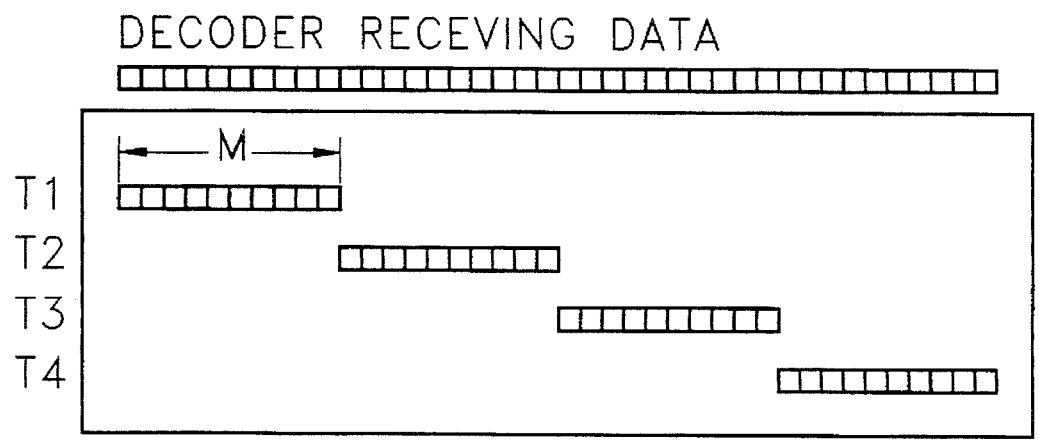
FIG. 3 is a view showing a decoding procedure by the conventional Viterbi algorithm.

FIG. 3 is a view showing a decoding procedure performed by the conventional Viterbi algorithm. In FIG. 3, when the code sequence which is convolutionally encoded is input to the Viterbi decoder, the decoder performs a decoding operation in units of a predetermined length, that is, a decoding depth. First of all, the code sequence is decoded in units of a decoding depth M for a first time T1 and the decoded code sequence is output. The following symbols forming the code sequence are read during a second time T2 in units of decoding depth M to perform a decoding operation. Such a procedure is repeated with respect to the identical time at intervals (T1, T2, T3, . . . ). As a result, when the data is wrongly decoded due to the error generated by noise added during transmission, all data corresponding to the decoding depth becomes suspect.

Figure 4A:
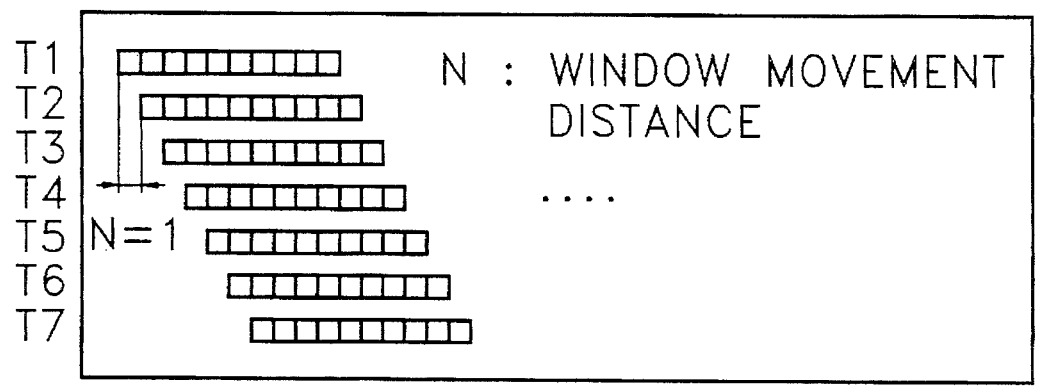
FIGS. 4A and 4B are views showing a decoding procedure for a Viterbi decoder comprising an overlapping function according to an embodiment of the present invention.
Figure 4B:
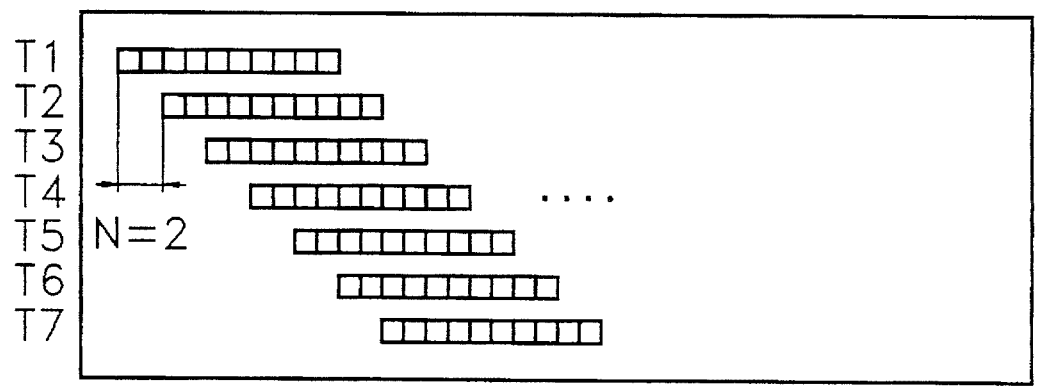

FIGS. 4A and 4B are views showing a decoding procedure in a Viterbi decoder comprising an overlapping function according to an embodiment of the present invention. The Viterbi decoder according to the present invention performs the decoding operation in units of the decoding depth. At the initial decoding operation, the decoding is performed for a first time T1 as in the conventional decoder. However, the decoding is not performed with respect to the following symbols for a following second time T2, but the decoding is performed in units of the decoding depth with respect to the symbols located in a position moved in a direction by one symbol to the right as shown in FIG. 4A, based on the symbols which are decoded during a first time T1. In this case, a window movement distance N is "1." By repetitively performing such a procedure, all the decoded symbols are decoded ten times except for the initial nine symbols. Also, when window movement distance N is "2" as shown in FIG. 4B, two symbols are moved for each decoding step, and all the symbols except for the initial eight symbols are decoded five times. Thus, the number of decodings with respect to the identical symbols, that is, "the number of the overlapping times" is generally represented in M/N. Here, M is the decoding depth and N is the window movement distance.

Figure 5:
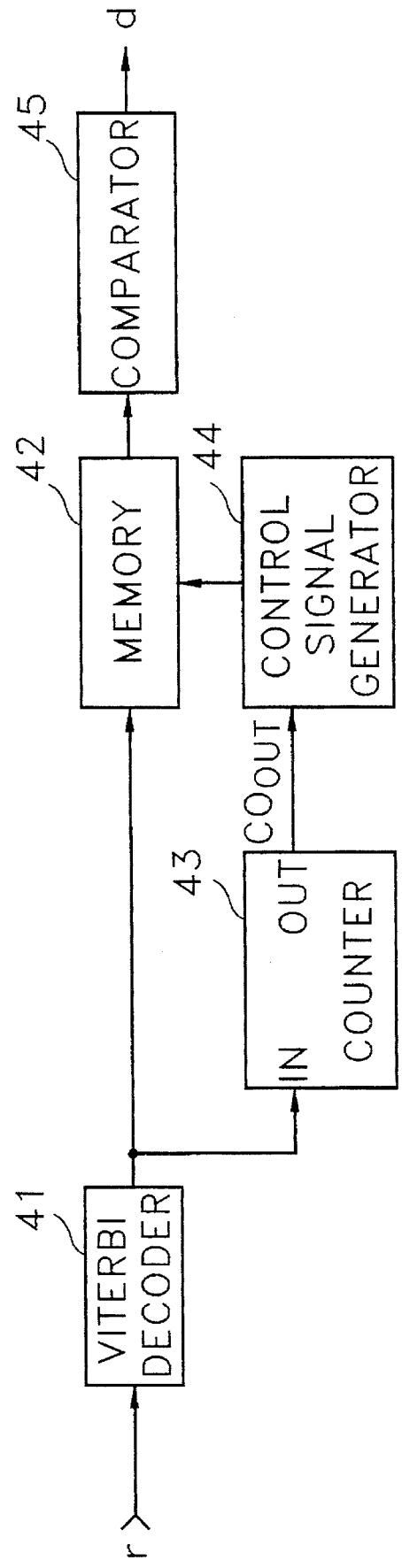
FIG. 5 is a block diagram showing a decoding apparatus having an optimum decoding path according to the present invention.

FIG. 5 is a block diagram showing a decoding apparatus having an optimum decoding path according to the present invention. The FIG. 5 apparatus includes a Viterbi decoder 41 which receives the code sequence, which is encoded, and decodes the received code sequence according to the Viterbi algorithm. Viterbi decoder 41 uses a window which is moved according to the predetermined window movement distance and determines the symbols to be decoded. The output of Viterbi decoder 41 is connected to a memory 42 which receives the symbols, which are decoded in units of the decoding depth and stores the received symbols. A counter 43 is connected to the output of Viterbi decoder 41 and counts the symbols output from Viterbi decoder 41 in units of the decoding depth. A control signal generator 44 is located between counter 43 and memory 42 and supplies a control signal to memory 42 in response to the count value $CO_{OUT}$ supplied from counter 43. A comparator 45 which is connected to memory 42 compares the number representing the generated frequency of the decoded data with respect to the identical symbols supplied from memory 42 with each other and outputs the most frequent data as the decoded information d.

In FIG. 5, Viterbi decoder 41 having an overlapping function receives code sequence r, which is encoded, and moves the symbols of code sequence r in units of a predetermined window movement distance to decode the moved symbols by units corresponding to the decoding depth. The decoded data is supplied in units of the decoding depth, to memory 42 and counter 43, respectively. Memory 42 has a storage size corresponding to decoding depth M multiplied by the number M/N representing the overlap of the codes, and sequentially stores the decoded data input in units of the decoding depth. When memory 42 is full, that is, when the count value is the same as the number representing the overlap of the codes, a storage operation is again performed starting from the lower address of memory 42, in which ($CO_{OUT}$ modulo M/N)=0 and $CO_{OUT} \geq M$. Counter 43 increments the count value by "1" whenever the decoded data for the decoding depth is input, and supplies the count value $CO_{OUT}$ to control signal generator 44. Control signal generator 44 compares the count value $CO_{OUT}$ applied from counter 43 with the number M/N representing the overlap during the decoding with respect to the symbols, and calculates the memory storage addresses according to the comparison result, to thereby permit output of the decoded data stored in the corresponding address of memory 42. That is, control signal generator 44 supplies the address signal with respect to the identical symbol to memory 42 according to count value $CO_{OUT}$ and window movement distance N. Accordingly, the received code sequence having the same size as the movement distance N among the code sequence of the number M/N representing the overlap of the total codes stored in memory 42 is supplied to comparator 45. When window movement distance N is "1," the decoded data supplied to comparator 45 exists in each code sequence corresponding to decoding depth M and is the data corresponding to the identical symbol. On the other hand, when window movement distance N is "2," the decoded data with respect to the two symbols among the code sequence corresponding to the decoding depth divided by 2, that is, M/2 is supplied to comparator 45. Comparator 45 compares the decoded data applied from memory 42 with each other and outputs the most frequent decoded data as decoded information of the corresponding symbol. When window movement distance N is "1," the most frequent decoded data is output with respect to one symbol. When window movement distance N is "2," the most frequent decoded data is output with respect to two symbols. When window movement distance is "N," the most frequent decoded data is outputted with respect to N symbols. Thus, comparator 45 outputs the decoded data having an optimum decoding path of the window movement distance with respect to each window movement distance.

FIGS. 6A through 6F are conceptional views for explaining the operation of the control signal generator shown in the FIG. 5 apparatus. Control signal generator 44 of FIG. 5 compares the count value $CO_{OUT}$ applied from counter 43 with the number M/N representing the overlap and checks the storage state of memory 42. Control signal generator 44 controls the output of the data stored in memory 42 in response to the storage state of memory 42.

Firstly, when the memory is not full, that is, when $CO_{OUT} < M/N$, control signal generator 44 controls the memory 42 to supply the decoded data stored in the address which meets equation (1) to comparator 45.

$$(N \times CO_{OUT}-1)-N \times i + i \times M + j \qquad (1)$$

Here, $i=0,1,\ldots,(CO_{OUT}-1)$, and $j=0,1,\ldots,(N-1)$.

For example, when the count value $CO_{OUT}$ is "3," window movement distance N is "1," and decoding depth M is "10" as shown in FIG. 6A, portions "b" are the empty portion in which the data does not occupy and portion "a" is the decoded data which is output to comparator 45. That is, the addresses of the output decoded data are ADDR 2, 11 and 20, respectively. Also, when the count value $CO_{OUT}$ is "3" and window movement distance N is "2," as shown in FIG. 6D, the addresses of the output decoded data are (4,5), (12,13) and (20,21), respectively.

Secondly, when the memory is full, that is, when ($CO_{OUT}$ modulo M/N) =0 and $CO_{OUT}$>M/N, the data of the addresses which meets the following equation (2) is output.

$$(M-N)-N \times i + i \times M + j \qquad (2)$$

Here, $i=0,1,\ldots,(M/N)-1$, and $j=0,1,\ldots N-1$.

For example, control signal generator 44 controls memory 42 so as to supply the codes stored in addresses 9, 18, 27, 36, 45, 54, 63, 72, 81 and 90 in case of FIG. 6B. Also, in case of FIG. 6E, control signal generator 44 controls memory 42 to output the data stored in addresses (8,9), (16,17), (24,25), (32,33) and (40,41).

Thirdly, when the decoded data input after memory 42 is full and is again stored starting from the lower address, that is, in case of ($CO_{OUT}$ modulo M/N)≠0 and $CO_{OUT} \geq$ M/N, control signal generator 44 controls memory 42 so as to supply the data stored in the addresses which meets the following equations (3) and (4) to comparator 45.

$$(CO_{OUT} \text{ modulo } M/N)-N \times i + i \times M + j \qquad (3)$$

Here, $i=0,1,\ldots,(CO_{OUT} \text{ modulo } M/N)-1$, and $j=0,1,\ldots,(N-1)$.

$$(CO_{OUT} \text{ modulo } M/N)+N-N \times i + i \times M + j \qquad (4)$$

Here, $i=(CO_{OUT} \text{ modulo } M/N),\ldots,(M/N)-1$, and $j=0,1,\ldots,N-1$.

For example, when the count value $CO_{OUT}$ is "13" and window movement distance N is "1," as shown in FIG. 6C, the addresses of the decoded data with respect to the identical symbol outputted from control signal generator 44 are 2, 11, 20, 39, 48, 57, 66, 75, 84 and 93, respectively. Also, when the count value $CO_{OUT}$ is "7" and window movement distance N is "2," as shown in FIG. 6F, the addresses of the decoded data with respect to the identical symbol outputted from control signal generator 44 are (2,3), (10,11), (28,29), (36,37) and (44,45), respectively.

As described above, the present invention relates to a decoding method and apparatus having an optimum decoding path, in which the place of the input data is moved in a predetermined symbol distance, the input data is decoded in units of the decoding depth, the overlapped decoded data is compared with each other, and the most frequent decoded data is selected. Accordingly, the error generated due to the wrong path selection can be reduced to thereby improve the decoding performance.

What is claimed is:

1. A decoding apparatus having an optimum decoding path for use in a digital communication apparatus which decodes a code sequence constituting symbols, said decoding apparatus comprising:

a decoder for decoding the symbols within a window formed in units representing a decoding depth after receiving the code sequence to generate decoded data, and for relocating the window on the code sequence by a predetermined movement distance whenever the decoding with respect to the window is completed;

memory means for storing the decoded data supplied from the decoder and for providing respective stored decoded data in response to respective address signals;

control means for receiving the decoded data from the decoder and generating respective said address signals permitting reproduction of said stored decoded data corresponding to an identical symbol from the memory means; and means for outputting the stored decoded data having the highest frequency of occurrence among the decoded data corresponding to the identical symbol received from the memory means.

2. The decoding apparatus having the optimum decoding path according to claim 1, wherein said decoder moves the window by the predetermined movement distance corresponding to a number of the symbols which is smaller than the decoding depth.

3. The decoding apparatus having the optimum decoding path according to claim 1, wherein said decoder generates the decoded data with respect to the symbols identical to an overlap number which is obtained by dividing the decoding depth by the predetermined movement distance.

4. The decoding apparatus having the optimum decoding path according to claim 3, wherein said memory means has a storage capacity which is determined by the decoding depth and the overlap number.

5. The decoding apparatus having the optimum decoding path according to claim 1, wherein said control means comprises:

a counter which counts the decoded data applied from said decoder in units of the decoding depth and outputs a counted value; and a control signal generator which compares the applied counted value with a predetermined reference number representing window overlap indicating storage state of the memory means, and generates respective said address signals corresponding to the storage state of the memory means.

6. The decoding apparatus having the optimum decoding path according to claim 5, wherein said control signal generator generates a control signal permitting reproduction said stored decoded data with respect to the identical symbol in units corresponding to respective predetermined movement distance.

7. The decoding apparatus having the optimum decoding path according to claim 6, wherein said control signal generator generates respective said address signals (ADDR) which satisfy the following equation when the counted value is smaller than the predetermined reference number, $$ADDR=(N \times CO_{OUT}-1)-N \times i + i \times M + j$$

where $i=0,1,\ldots,(CO_{OUT}-1)$ and $j=0,1,\ldots,(N-1)$, wherein $CO_{OUT}$ is the counted value, N is respective predetermined movement distance, and M is the decoding depth.

8. The decoding apparatus having the optimum decoding path according to claim 6, wherein said control signal generator generates corresponding respective address signals according to a result obtained by dividing the counted value by the predetermined reference number when the counted value is greater than or equal to the predetermined reference number.

9. The decoding apparatus having the optimum decoding path according to claim 8, wherein said control signal generator generates respective said address signals (ADDR) which satisfy the following equation when a division result produces no residue, $$ADDR=(M-N)-N \times i + i \times M \times j$$

where $i=0,1,\ldots,(M/N)-1$, and $j=0,1,\ldots,N-1$, wherein N is respective predetermined movement distance, $CO_{OUT}$ is the counted value and M is the decoding depth.

10. The decoding apparatus having the optimum decoding path according to claim 8, wherein said control signal generator generates respective said address signals (ADDR) which satisfies the following equations when a division result has a predetermined residue, $$(CO_{OUT}\ modulo\ M/N)-N \times i + i \times M + j$$

where $i=0,1,\ldots,(CO_{OUT}\ modulo\ M/N)-1$ and $$(CO_{OUT}\ modulo\ M/N)+N-N \times i + i \times M + j$$

where $i=(CO_{OUT}\ modulo\ M/N),\ldots,(M/N)-1$, wherein $j=0,1,\ldots(N-1)$ and wherein N is respective predetermined movement distance, $CO_{OUT}$ is the counted value, and M is the decoding depth.

11. The decoding apparatus having the optimum decoding path according to claim 6, wherein said outputting means comprises a comparator which compares the decoded data with respect to the identical symbols in units of respective predetermined movement distance.

12. A decoding method having an optimum decoding path for use in a digital communication which decodes a code sequence having symbols, said decoding method comprising the steps of:

(a) decoding the symbols within a window formed in units of a decoding depth after receiving the code sequence to thereby generate decoded data;

(b) repositioning the window on the code sequence by a predetermined movement distance whenever the decoding step (a) with respect to the window is completed;

(c) storing the decoded data generated for each respective window to produce stored decoded data;

(d) reading the stored decoded data corresponding to an identical symbol among the stored decoded data; and (e) comparing the read decoded data with each other to thereby output the decoded data having a maximum frequency of occurrence as the corresponding symbol.

13. The decoding method having the optimum decoding path according to claim 12, wherein the step (b) comprises a step of moving the window by the predetermined movement distance which is associated with the number of symbols and which is smaller than the decoding depth.

14. The decoding method having the optimum decoding path according to claim 12, wherein the step (b) comprises a step (b1) for decoding the identical symbol by an overlap number obtained by dividing the decoding depth by the predetermined movement distance.

15. The decoding method having the optimum decoding path according to claim 12, wherein the step (c) comprises storing the decoded data by a memory having a storage capacity which is determined by the decoding depth and an overlap number.

16. The decoding method having the optimum decoding path according to claim 12, wherein the step (d) comprises the steps of:

(d1) counting the decoded data generated in the step (a) in units representing the decoding depth to thereby generate a count value;

(d2) comparing the count value generated by step (d1) with a predetermined reference number representing window overlap; and (d3) reading that one of the stored decoded data corresponding to the identical symbol among the stored decoded data.

17. The decoding method having the optimum decoding path according claim 16, wherein the step (d3) comprises producing the stored decoded data in units representative of the predetermined movement distance.

18. The decoding method having the optimum decoding path according to claim 16, wherein the step (d2) comprises comparing the decoded data with respect to the identical symbol in units representing window movement by the predetermined movement distance with respect to each other.

* * * * *